Feb. 28, 1928.

H. M. BECKMAN 1,660,410

FRUIT CONTAINER

Filed March 8, 1926

INVENTOR

*H. M. Beckman*

BY *Perry S. Webster*

ATTORNEY

Patented Feb. 28, 1928.

1,660,410

UNITED STATES PATENT OFFICE.

HENRY M. BECKMAN, OF EXETER, CALIFORNIA.

FRUIT CONTAINER.

Application filed March 8, 1926. Serial No. 93,026.

This invention relates to improvements in containers for shipping fresh fruit and other perishable produce, my principal object being to provide a device for the purpose so constructed that the fruit while in transit or otherwise in the container will be properly ventilated and exposed to constant contact with fresh air for practically its entire bulk, and a circulation of air may be easily maintained through such bulk.

The use of this container will I believe eliminate the principal cause of deterioration of fruit and the like, namely the sweating and molding of the same due to lack of air through the bulk of the fruit as when packed in a solid mass in the ordinary solid walled boxes.

With my improved container it will be possible to ship fresh fruit and the like for great distances without the danger of same spoiling and without necessitating the use of refrigeration as long as a supply of fresh air has access to the fruit more or less constantly during its period of transit. The method and means I employ for providing such circulation of air, in connection with my improved container, and thus preserving the fruit while in transit is particularly set forth in my copending application for patent, Serial No. 95,790, filed March 18th, 1926.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
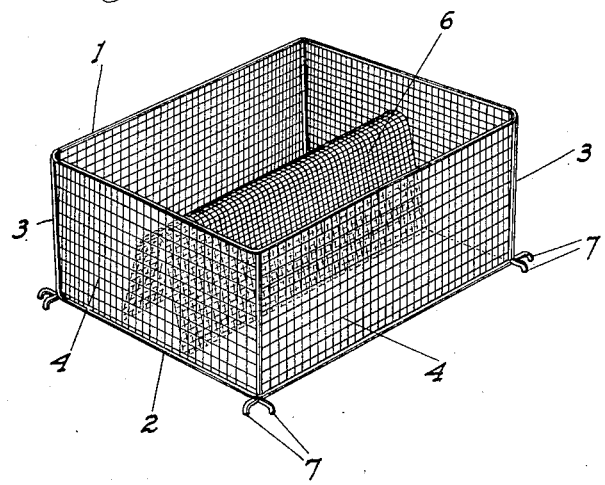
Fig. 1 is a perspective elevation of my improved container.
Figure 2:
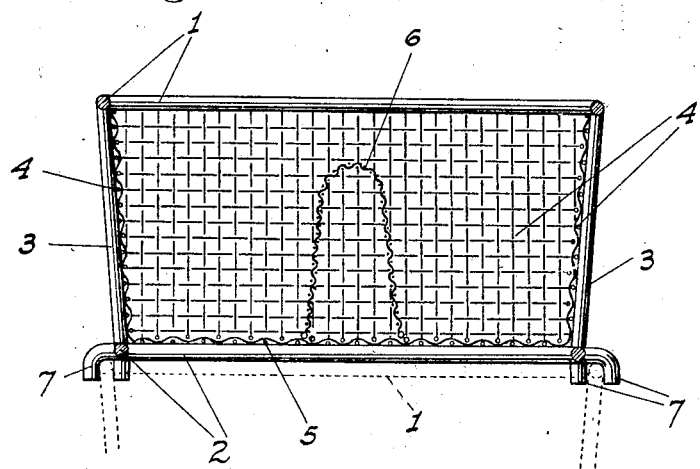
Fig. 2 is a cross section of the same.

Referring now more particularly to the characters of reference on the drawings, I preferably form the container with horizontal top and bottom frames 1 and 2, preferably rectangular, and made of stiff wire or light iron rods, depending on the size of the container.

These frames are rigidly connected together by corner members 3 of similar rigid material. The area of the bottom frame is preferably slightly less than that of the top frame, while being symmetrical relative thereto, so that the sides and ends of the container have a downwardly converging slope.

The sides and end walls of the container are preferably formed of substantial wire netting 4 having a mesh preferably not over a quarter of an inch, the bottom 5 being of the same material. The side and bottom nettings are secured to the frame members in any suitable manner.

Projecting lengthwise of the container and extending from end to end thereof is a removable partition 6, resting on the bottom 5. This partition is formed as an arched or inverted U-shaped member of wire netting, the sides of each member being spaced apart a certain distance to leave a longitudinal air passage therebetween as shown. Though shown herein as longitudinal this partition may extend transversely of the container, or both longitudinal and transverse partitions may be provided, depending on the size of the container. The partition being removable it may be shifted in its position in the container or it may be left out entirely, as may be desired. It will therefore be seen that the area of the container may be very easily divided into two or more compartments in which the fruit is placed. Since the walls of each compartment are open to the air at the top, bottom and sides, the fruit in the container is divided up into relatively small masses, each of which has constant contact with fresh air for a considerable portion of its surface area.

The sides of the container converging downwardly, a number of containers may be arranged together in close side by side or end to end relation, and still have an air space therebetween, to allow of a circulation of air between adjacent side walls of the various containers.

Projecting horizontally from the bottom frames 2 at the ends thereof both laterally and longitudinally are extensions 7 whose outer ends are turned down. These extensions not only serve as feet to support the container and hold the bottom of the same raised, if said container rests on a solid surface, but also as locating means for engagement with the upper frames 1 of an underimposed container, maintaining the two in definite relation to each other.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A foraminous container for fruits and the like, and an inverted U-shaped foraminous partition having the ends of the U removably resting on the bottom of the container.

2. A foraminous container for fruits and the like, and a double-walled foraminous partition in the container, the sides of the partition diverging from the top down, whereby to enable the partition to rest on the bottom of the container in a stable and self-supporting manner.

3. A foraminous container for fruits and the like, and a foraminous partition in the container formed of a piece of wire netting bent to an arch-shaped form to provide an air space through the partition from end to end and adapted to rest on the bottom of the container.

In testimony whereof I affix my signature.

HENRY M. BECKMAN.